(12) United States Patent
Zhou

(10) Patent No.: US 9,869,356 B2
(45) Date of Patent: Jan. 16, 2018

(54) CONCEALED DUAL MOVING DISC BRAKE

(71) Applicant: NINGBO C-STAR BICYCLE CO., LTD., Ningbo (CN)

(72) Inventor: Zheng-Jun Zhou, Ningbo (CN)

(73) Assignee: Ningbo C-Star Bicycle Co., Ltd., Ningbo (CN)

( * ) Notice: Subject to any disclaimer, the term of this patent is extended or adjusted under 35 U.S.C. 154(b) by 0 days.

(21) Appl. No.: 15/265,464

(22) Filed: Sep. 14, 2016

(65) Prior Publication Data
US 2017/0284487 A1 Oct. 5, 2017

(30) Foreign Application Priority Data

Apr. 1, 2016 (CN) .......................... 2016 1 0217997

(51) Int. Cl.
| | |
|---|---|
| *F16D 65/14* | (2006.01) |
| *F16D 55/2265* | (2006.01) |
| *F16D 65/00* | (2006.01) |
| *F16D 55/00* | (2006.01) |

(52) U.S. Cl.
CPC ..... *F16D 55/2265* (2013.01); *F16D 65/0068* (2013.01); *F16D 2055/0016* (2013.01); *F16D 2055/0033* (2013.01)

(58) Field of Classification Search
CPC .... F16D 65/008; F16D 55/2265; F16D 27/02; F16D 55/40; F16D 55/224; F16D 55/225; F16D 65/21; F16D 65/123; F16D 65/125; F16D 65/0068; F16D 2055/0016; F16D 2055/0033; B60T 1/06; B60T 1/065

USPC ..... 188/73.45, 71.5, 71.7, 72.3, 72.4, 24.12, 188/24.16
See application file for complete search history.

(56) References Cited

U.S. PATENT DOCUMENTS

| | | | | |
|---|---|---|---|---|
| 6,119,818 | A * | 9/2000 | Krumbeck | B62L 1/00 188/24.12 |
| 6,491,137 | B2 * | 12/2002 | Lumpkin | B60T 11/046 188/24.15 |
| 9,476,467 | B2 * | 10/2016 | Qiang | F16D 55/40 |
| 2012/0318622 | A1 * | 12/2012 | Miller | F16D 65/186 188/71.7 |
| 2013/0056314 | A1 * | 3/2013 | Diaz De Cerio Garcia De Mendaza | F03D 7/0248 188/71.1 |

* cited by examiner

*Primary Examiner* — Pamela Rodriguez
(74) *Attorney, Agent, or Firm* — Muncy, Geissler, Olds & Lowe, P.C.

(57) ABSTRACT

The present invention discloses a concealed dual moving disc brake, comprising left and light calipers, static discs, moving discs, and a drawing arm and brake cable. The calipers are fixed together via a caliper-fastening screw. The static discs are riveted within the calipers. In rolling paths of the static discs, a left and a right steel ball are provided. The drawing arm is mounted inside the static discs. The brake pads are moved toward each other during braking, such that the disc is located centrally without deformation to prolong service life. Simple and easy mounting adjustment is performed, only if the brake lever is held to lock the disc brake. The drawing arm is concealed within the head cover to form a succinct and aesthetic appearance. This product is the connection between the high-end mechanical disc brake and the low-end oil pressure disc brake with significant market prospect and potential.

4 Claims, 3 Drawing Sheets

CONCEALED DUAL MOVING DISC BRAKE

FIELD OF THE INVENTION

The present invention is related to a disc brake, particularly to a concealed dual moving disc brake.

BACKGROUND OF THE INVENTION

In the present market, a disc brake has been firstly selected as a braking system of a bicycle. The single moving mechanical disc brake, the dual moving mechanical disc brake and the oil pressure disc brake are prevalently used in the current market. In the single moving disc brake, the disc may be pushed toward one side to be deformed due to one-sided movement of the brake pads, and is not easy to be adjusted when mounted. Moreover, the drawing arm for the brake cable may be seen in the single moving mechanical disc brake without satisfactory aesthetics. Similarly, the brake cable and the drawing arm may be also seen in the dual moving mechanical disc brake in the current market, which leads to the problem of unsatisfactory aesthetics equally. In addition, abuses including liability to oil leakage, thermal expansion, difficult adjustment, troublesome maintenance and etc., are presented in the oil pressure disc brake with higher cost.

SUMMARY OF THE INVENTION

It is the object of the present invention to provide a concealed dual moving disc brake with an undeformed disc and long service life, so as to solve the problems mentioned in the above background of the invention.

For achieving the above object, the present invention provides technical solutions as follows.

The present invention is a related to a concealed dual moving disc brake, comprising a left caliper, a left static disc, a left moving disc, a drawing arm, a right moving disc, a right static disc, a right caliper and a brake cable. The left caliper and the right caliper are connected and fixed to each other via a caliper-fastening screw. The left static disc and the right static disc are riveted within the left caliper and the right caliper, respectively. In rolling paths for steel balls of the left static disc and the right static disc, there are provided with a left steel ball and a right steel ball, respectively. The drawing arm is mounted inside the left static disc and the right static disc. The left moving disc and the right moving disc are fixed at two sides of the drawing arm via a left fastening screw and a right fastening screw, respectively. In circular recesses on back faces of the left fastening screw and the right fastening screw, there are provided with a left releasing ring and a right releasing ring, respectively. In center through-holes of the left releasing ring and the right releasing ring, there are provided with a left magnet and a right magnet, respectively. A left brake pad and a right brake pad are attracted at the bottom of the left magnet and the right magnet, respectively. The drawing arm is provided at a rear side thereof with a cable-guiding jacket, and the cable-guiding jacket is then provided at a rear side thereof with a brake cable-regulating knob. At the top of the drawing arm, a brake cable-fastening nut and a brake cable-fastening screw are further mounted. The brake cable is allowed for passing through the cable-guiding jacket, the brake cable-fastening nut and the drawing arm in turn, and then protruding away from a cable-guiding socket of the right caliper. A left plastic cover and a right plastic cover are fixed to the top of the left caliper and the right caliper via a respective plastic cover-fastening screw, respectively. A head cover is provided between the left plastic cover and the right plastic cover.

As a further solution of the present invention, the left moving disc and the right moving disc are provided thereon with a respective hexagonal step, while the drawing atm is provided thereon with hexagonal holes in cooperation with the hexagonal steps, respectively. As a further solution of the present invention, each of the left plastic cover and the right plastic cover is provided with a slide track. The head cover is allowed for sliding into the slide tracks of the left plastic cover and the right plastic cover, so as to clad the drawing arm. As a still further solution of the present invention, the material of the drawing arm is spring steel. The drawing arm is located inside the left caliper and the right caliper.

In comparison with current technology, the effects of the present invention are as follows.

In this present invention, the brake pads are moved toward each other during braking, such that the disc is located centrally without deformation, so as to prolong the service life of the disc. Moreover, simple and easy mounting adjustment may be performed, only if the brake lever is held to lock the disc brake. Furthermore, the drawing arm is concealed within the head cover, so as to form a succinct and aesthetic appearance. Therefore, this product is the connection between the high-end mechanical disc brake and the low-end oil pressure disc brake with significant market prospect and potential.

DETAILED DESCRIPTION OF THE PREFERRED EMBODIMENTS

Figure 1:
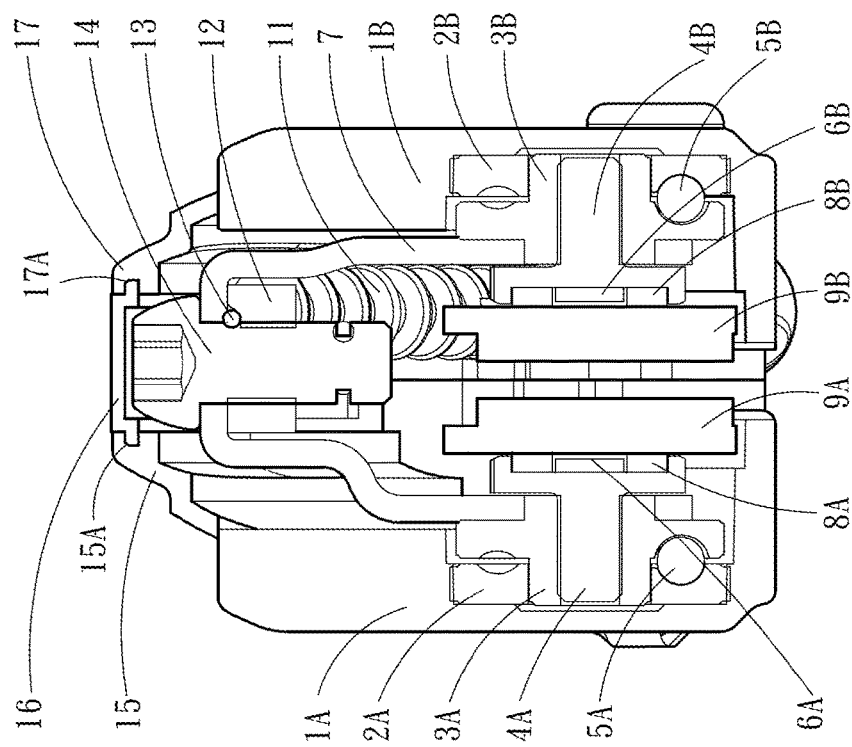
FIG. 1 is a structural diagram of the present invention.
Figure 2:
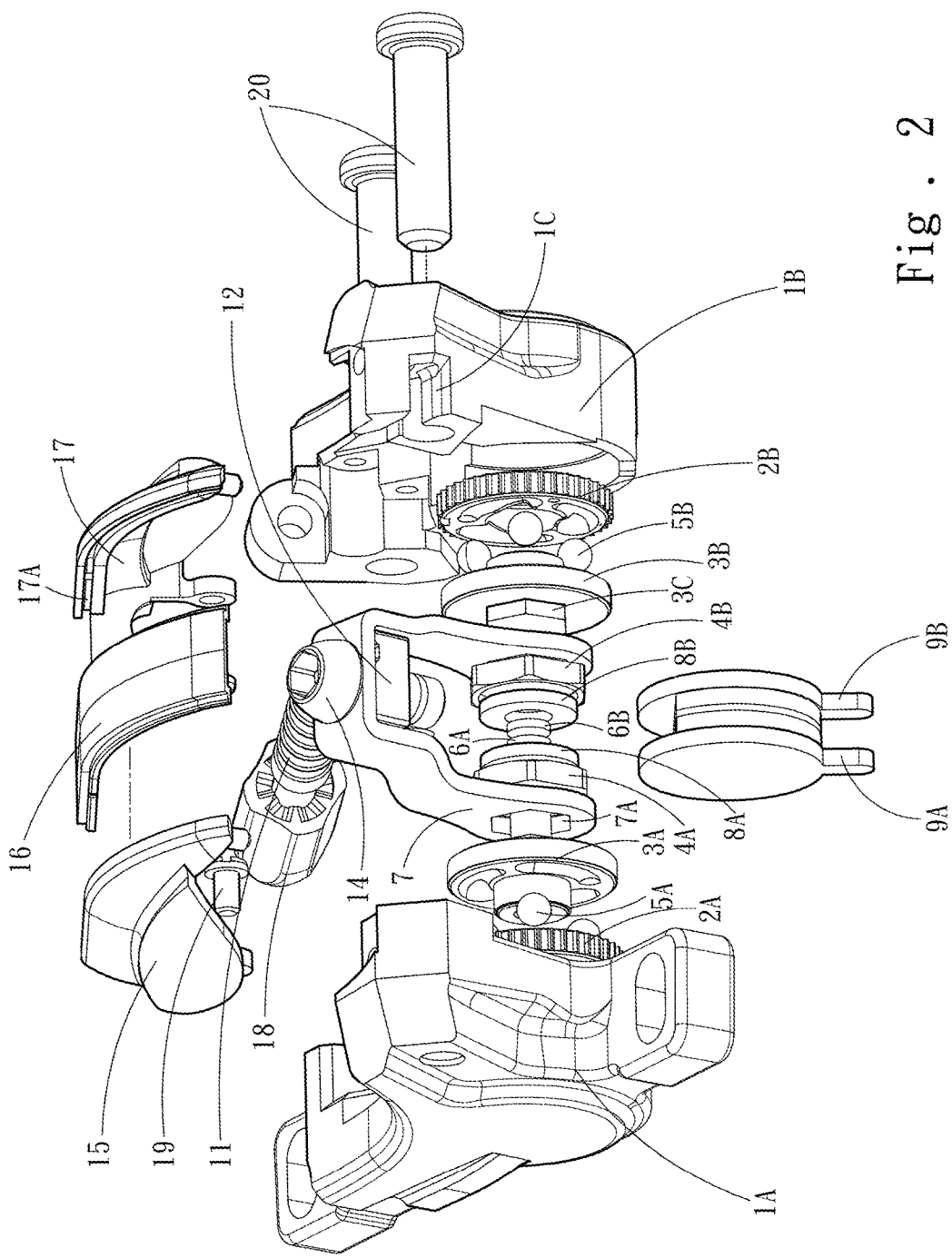
FIG. 2 is a first exploded view of the present invention.
Figure 3:
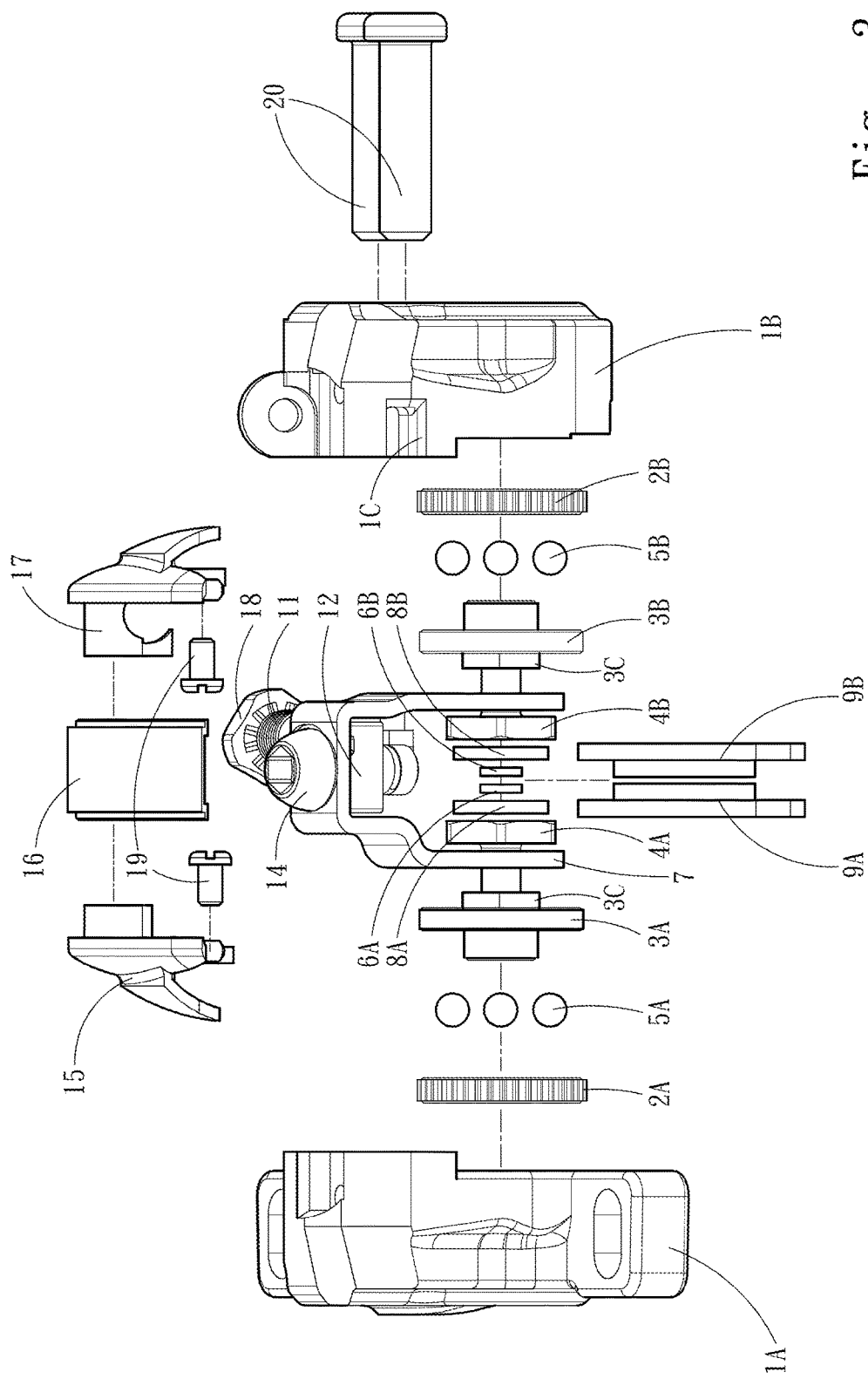
FIG. 3 is a second exploded view of the present invention.

The technical solution of the present invention will be further described below in detail in conjunction with an embodiment Referring to FIGS. 1, 2 and 3, the present invention is a related to a concealed dual moving disc brake, comprising a left caliper 1A, a left static disc 2A, a left moving disc 3A, a drawing arm 7, a right moving disc 3B, a right static disc 2B, a right caliper 1B and a brake cable 13. The left caliper 1A and the right caliper 1B are connected and fixed to each other via a caliper-fastening screw 20. The left static disc 2A and the right static disc 2B are riveted within the left caliper 1A and the right caliper 1B, respectively. In rolling paths for steel balls of the left static disc 2A and the right static disc 2B, there are provided with a left steel ball 5A and a right steel ball 5B, respectively. In this case, the rolling path for the steel ball of the left static disc 2A and that of the right static disc 2B are mirrored completely, so as to ensure that the left steel ball 5A and the right steel ball 5B are moved toward each other along the axes of the left static disc 2A and the right static disc 2B, respectively, during braking.

The drawing arm 7 is mounted inside the left static disc 2A and the right static disc 2B, while the drawing arm 7 is located inside the left caliper 1A and the right caliper 1B. The drawing arm 7 is operated for drawing the brake cable 13, while operated for restoring resilience of the brake pads. The left moving disc 3A and the right moving disc 3B are fixed at two sides of the drawing arm 7 via a left fastening screw 4A and a right fastening screw 4B, respectively. In circular recesses on back faces of the left fastening screw 4A and the right fastening screw 4B, there are provided with a left releasing ring 8A and a right releasing ring 8B, respectively. The left releasing ring 8A and the right releasing ring 8B are operated for preventing the disc from being locked up by the brake pads during braking, so as to achieve the effect of release. In center through-holes of the left releasing ring 8A and the right releasing ring 8B, there are provided with a left magnet 6A and a right magnet 6B, respectively. A left brake pad 9A and a right brake pad 9B are attracted at the bottom of the left magnet 6A and the right magnet 6B, respectively. The left magnet 6A and the right magnet 6B are used for attracting the left releasing ring 8A, the right releasing ring 8B, the left brake pad 9A and the right brake pad 9B simultaneously. The drawing arm 7 is provided at a rear side thereof with a cable-guiding jacket 11, and the cable-guiding jacket 11 is then provided at a rear side thereof with a brake cable-regulating knob 18. At the top of the drawing arm 7, a brake cable-fastening nut 12 and a brake cable-fastening screw 14 are further mounted. The brake cable 13 is allowed for passing through the cable-guiding jacket 11, the brake cable-fastening nut 12 and the drawing arm 7 in turn, and then protruding away from a cable-guiding socket 1C of the right caliper 1B. A left plastic cover 15 and a right plastic cover 17 are fixed to the top of the left caliper 1A and the right caliper 1B via a respective plastic cover-fastening screw 19, respectively. A head cover 16 is provided between the left plastic cover 15 and the right plastic cover 17.

The left moving disc 3A and the right moving disc 3B are provided thereon with a respective hexagonal step 3C, while the drawing arm 7 is provided thereon with hexagonal holes 7A in cooperation with the hexagonal steps 3C, respectively. The hexagonal steps 3C of the left moving disc 3A and the right moving disc 3B are inserted into the hexagonal holes 7A of the drawing arm 7, respectively, and the left moving disc 3A and the right moving disc 3B are then connected with the drawing arm 7 via the left fastening screw 4A and the right fastening 4B, respectively. Each of the left plastic cover 15 and the right plastic cover 17 is provided with a slide track 15A, 17A. The head cover 16 is allowed for sliding into the slide track 15A of the left plastic cover 15 and the slide track 17A of the right plastic cover 17, so as to clad the drawing arm 7. The material of the drawing arm 7 is spring steel.

The brake cable 13 is allowed for passing through the cable-guiding jacket 11, through the brake cable-fastening nut 12 and the drawing arm 7, then through the cable-guiding socket 1C of the right caliper 1B, and finally exiting. In this way, the whole brake cable 13 is also concealed within the left plastic cover 15, the right plastic cover 17 and the head cover 16, such that the drawing arm 7 and the brake cable 13 could not be seen on the whole appearance. When the drawing arm 7 is pulled by the brake cable 13, the left steel ball 5A and the right steel ball 5B are driven by the left moving disc 3A and the right moving disc 3B, so as to push the left moving disc 3A and the right moving disc 3B to move toward each other along the axes along with rotation. Thus, the left releasing ring 8A and the right releasing ring 8B are pushed to move toward each other. The motion is then transmitted to the left brake pad 9A and the right brake pad 9B via the left releasing ring 8A and the right releasing ring 8B, so as to realize braking operation. Therefore, the disc is not locked up by the left brake pad 9A and the right brake pad 9B, while the left brake pad 9A and the right brake pad 9B are also not dropped under the effect of the left releasing ring 8A and the right releasing ring 8B during braking.

At this time, the drawing arm 7 is situated at a squeezed state when the drawing arm 7 is affected by both of the drawing force of the brake cable 13, as well as the thrust force of the left moving disc 3A and the right moving disc 3B. When the brake is not executed, the tensile force exerted on the drawing arm 7 by the brake cable 13 is disappeared. Then, the drawing arm 7 is started to rebound under the effect of tension of the drawing arm 7 itself. In the meantime, the left moving disc 3A, the right moving disc 3B and the drawing arm 7 are allowed to rebound and then restore together to original positions along the rolling paths for steel balls. Thus, the function of brake release is achieved. The whole action of brake and release is completed under the enclosure composed of the left caliper 1A, the right caliper 1B, the left plastic cover 15 and the right plastic cover 17.

In this present invention, the brake pads are moved toward each other during braking, such that the disc is located centrally without deformation, so as to prolong the service life of the disc. Moreover, simple and easy mounting adjustment may be performed, only if the brake lever is held to lock the disc brake. In addition, the drawing arm is concealed within the head cover, so as to form a succinct and aesthetic appearance. Therefore, this product is the connection between the high-end mechanical disc brake and the low-end oil pressure disc brake with potential market prospect.

What is claimed is:

1. A concealed dual moving disc brake, characterized by comprising a left caliper, a left static disc, a left moving disc, a drawing arm, a right moving disc, a right static disc, a right caliper and a brake cable, said left caliper and said right caliper being connected and fixed to each other via a caliper-fastening screw, said left static disc and said right static disc being riveted within said left caliper and said right caliper, respectively, a left steel ball and a right steel ball being provided in rolling paths for steel balls of said left static disc and said right static disc, respectively, said drawing arm being mounted inside said left static disc and said right static disc, said left moving disc and said right moving disc being fixed at two sides of said drawing arm via a left fastening screw and a right fastening screw, respectively, said left fastening screw and said right fastening screw being provided in circular recesses on back faces thereof with a left releasing ring and a right releasing ring, respectively, said left releasing ring and said right releasing ring being provided in center through-holes thereof with a left magnet and a right magnet, respectively, a left brake pad and a right brake pad being attracted at the bottom of said left magnet and said right magnet, respectively, said drawing atm being provided at a rear side thereof with a cable-guiding jacket, said cable-guiding jacket being then provided at a rear side thereof with a brake cable-regulating knob, a brake cable-fastening nut and a brake cable-fastening screw being further mounted at the top of said drawing arm, said brake cable being allowed for passing through said cable-guiding jacket, said brake cable-fastening nut and said drawing arm in turn, and then protruding away from a cable-guiding socket of said right caliper, a left plastic cover and a right plastic cover being fixed to the top of said left caliper and said right caliper via a respective plastic cover-fastening screw, respectively, a head cover being provided between said left plastic cover and said right plastic cover.

2. The concealed dual moving disc brake according to claim 1, characterized in that said left moving disc and said right moving disc are provided thereon with a respective hexagonal step, while said drawing arm is provided thereon with hexagonal holes in cooperation with said hexagonal steps, respectively.

3. The concealed dual moving disc brake according to claim 1, characterized in that each of said left plastic cover and said right plastic cover is provided with a slide track, said head cover being allowed for sliding into said slide tracks of said left plastic cover and said right plastic cover, so as to clad said drawing arm.

4. The concealed dual moving disc brake according to claim 1, characterized in that the material of said drawing arm is spring steel, said drawing arm being located inside said left caliper and said right caliper.

* * * * *